(No Model.)
T. EVANS.
APPARATUS FOR THE PASTEURIZATION OF BEER.
No. 425,310. Patented Apr. 8, 1890.
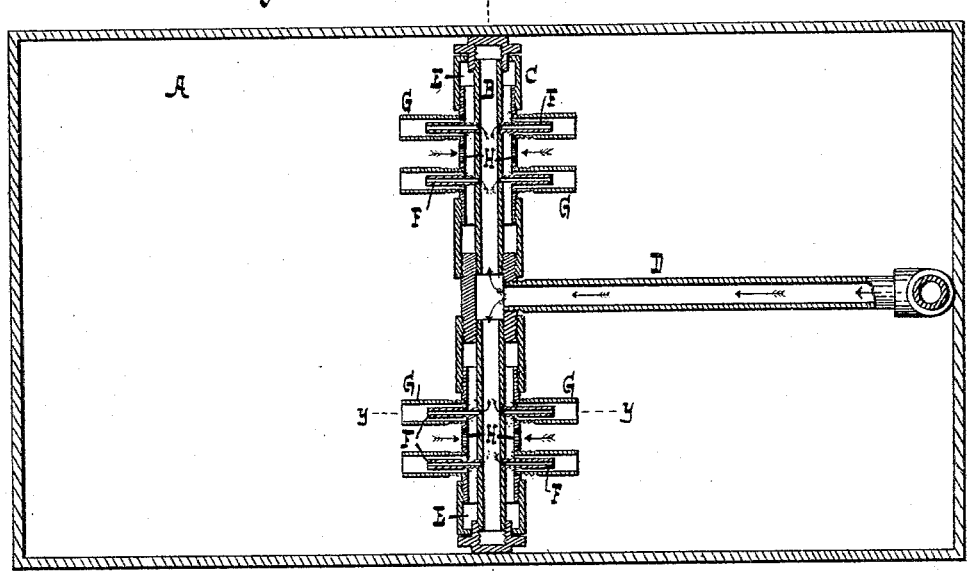
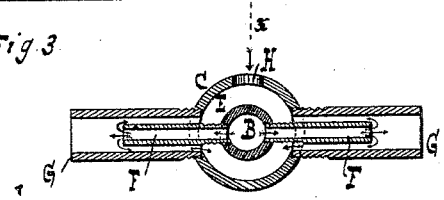
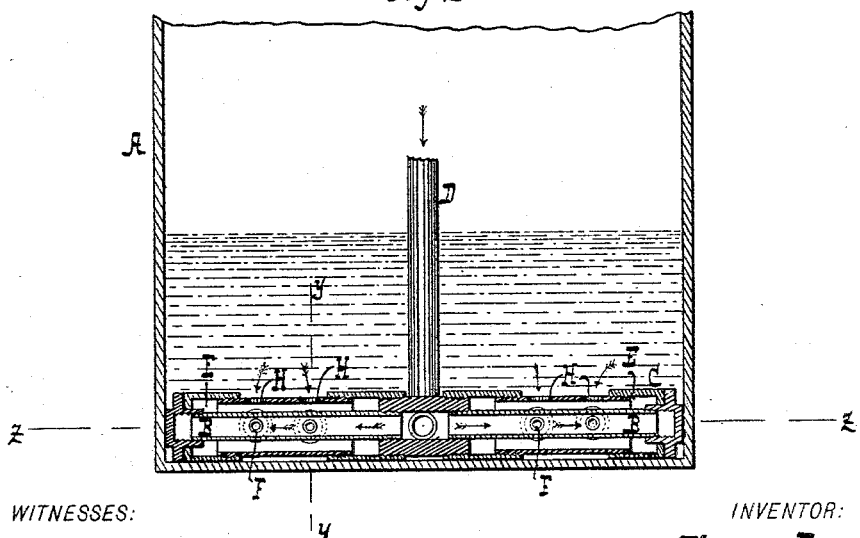
WITNESSES:
Oscar A. Michel
William Miller
INVENTOR:
Thomas Evans.
BY
Van Santvoord & Hauff,
ATTORNEYS

United States Patent Office.

THOMAS EVANS, OF NEW YORK, N. Y., ASSIGNOR TO RICHARD K. OWENS, OF SAME PLACE.

APPARATUS FOR THE PASTEURIZATION OF BEER.

SPECIFICATION forming part of Letters Patent No. 425,310, dated April 8, 1890.

Application filed August 29, 1889. Serial No. 322,283. (No model.)

*To all whom it may concern:*

Be it known that I, THOMAS EVANS, a citizen of the United States, residing at New York, in the county and State of New York, have invented new and useful Improvements in Apparatus for the Pasteurization of Beer, of which the following is a specification.

This invention relates to apparatus for the pasteurization of beer; and it consists in certain novel features hereinafter described, reference being had to the accompanying drawings, in which—

Figure 1 is a horizontal section of the apparatus, taken on the line $z\ z$ of Fig. 2. Fig. 2 is a vertical section of the apparatus, taken on the line $x\ x$ of Fig. 1. Fig. 3 represents a vertical cross-section taken on the lines $y\ y$ both of Figs. 1 and 2.

Similar letters indicate corresponding parts.

In a tank A, which is to be filled or nearly filled with water, is placed on or near the bottom of the tank a steam-chamber B, surrounded by a water jacket or chamber C. The steam-chamber is supplied with steam through the steam-pipe D, that descends to the lower part of the tank and extends along its bottom and enters the middle part of the steam-chamber. An annular space E is formed between the two chambers, except at the place where the steam-pipe D enters the steam-chamber. The ends of the said steam and water chambers are closed by suitable stuffing-boxes. The steam from the steam-chamber B passes out from it through a hollow nipple F, (one or more,) which extends from the side of chamber B through the said annular space E into a hollow nipple G, (one or more,) projecting from the water-jacket C. In this example I have shown eight such nipples extending from the steam-chamber and a corresponding number extending from the water-jacket; but I do not confine my invention to the use of any particular number.

The walls of the water-jacket C are provided with openings H, through which the water in the tank can pass and enter into the annular spaces E, whence the water is free to flow into the hollow nipples G, whose outer ends open into the tank, as is clearly shown in Figs. 1 and 2.

In using the apparatus the bottles of beer to be treated are placed in the tank in any suitable or usual manner, immersed in the water in the tank, and, steam being supplied through pipe D, the steam enters the steam-chamber B and passes thence out through the hollow nipple or nipples F, thence into the hollow nipples G, and thence into the body of water in the tank. The steam in its course clears the steam-chamber and the annular spaces E and the nipples F and G of the water which may have collected therein, and by causing a partial vacuum to take place in those passages causes a current of water to run through them from the openings H, whereby the water is kept constantly in contact with the currents of steam, and consequently becomes warmed to a uniform temperature, the steam meanwhile being compelled to pass from the lower part of the tank to the upper through the body of water, so that the heat from the steam is well diffused and the fresh steam is not likely to come in direct contact with the bottles.

What I claim as new, and desire to secure by Letters Patent, is—

In an apparatus for steaming bottles of beer, the combination of a steam-chamber, a pipe for supplying steam to said chamber, a water-jacket surrounding the steam-chamber and provided with openings in its sides, one or more hollow nipples projecting from the water-jacket, and corresponding hollow nipples projecting from the steam-chamber into the nipples of the water-jacket, substantially as shown and described.

In testimony whereof I have hereunto set my hand in the presence of two subscribing witnesses.

THOMAS EVANS.

Witnesses:
R. K. OWENS,
J. F. SCHOTT.